United States Patent [19]

Coyne

[11] 3,712,391
[45] Jan. 23, 1973

[54] MOLE GUIDANCE SYSTEM

[75] Inventor: James Christopher Coyne, New Providence, N.J.

[73] Assignee: Bell Telephone Laboratories, Inc., Murray Hill, Berkeley Heights, N.J.

[22] Filed: June 28, 1971

[21] Appl. No.: 157,570

Related U.S. Application Data

[63] Continuation of Ser. No. 792,893, Dec. 27, 1968.

[52] U.S. Cl. ..................... 175/26, 175/45, 175/61
[51] Int. Cl. ................... E21b 47/022, E21b 47/024
[58] Field of Search ...... 175/26, 45; 61/72.7; 340/32; 114/21 R, 21 W, 23

[56] References Cited

UNITED STATES PATENTS

| 3,461,979 | 8/1969 | Newfarmer | 175/56 X |
| 3,525,405 | 8/1970 | Coyne et al. | 175/45 X |
| 3,529,682 | 9/1970 | Coyne et al. | 340/32 X |
| 3,544,957 | 12/1970 | Smetanin et al. | 175/45 X |
| 3,589,454 | 6/1971 | Coyne | 175/26 |

FOREIGN PATENTS OR APPLICATIONS

1,240,830  7/1971  Great Britain..........................175/45

Primary Examiner—Samuel Feinberg
Assistant Examiner—James M. Hanley
Attorney—R. J. Guenther et al.

[57] ABSTRACT

A subterranean missile is equipped with three mutually orthogonal coils in its body and a fourth suitably fixed in an articulatable steering member. The missile is guided along any desired underground trajectory defined with reference to a coordinate system including the plane of a dipole-quadrupole antenna system laid on the ground above. Voltages induced in the noncenterline body coils are used in a closed feedback loop to maintain the resultant magnetic field circularly polarized at the mole location. Heading errors are then revealed as a voltage phasor on the centerline coil. Rotation of the steering member sufficiently to bring the voltage induced in its coil into phase with the centerline coil voltage also aligns the steering member such that its articulation will reduce the heading error to zero. Any new trajectory may be defined as a suitable new voltage added to the centerline coil voltage.

1 Claim, 13 Drawing Figures

FIG. 5A
(TOP VIEW FROM ANTENNA PLANE)

FIG. 5C
(TOP VIEW)

FIG. 5B
(SIDE ELEVATION TAKEN IN FLUX PLANE)

FIG. 5D
(SIDE ELEVATION)

MOLE GUIDANCE SYSTEM

CROSS REFERENCE TO RELATED APPLICATION

This application is a continuation of my copending application, Ser. No. 792,893, filed Dec. 27, 1968.

This invention relates to subterranean missiles, and specifically concerns a guidance system for such devices.

BACKGROUND OF THE INVENTION

In the U.S. Pat. No. 3,529,682 of J. C. Coyne et al. there is described a system for continuously detecting the position and attitude of a subterranean missile or "Mole" with respect to a fixed coordinate system relative to a pair of antennas laid on the ground over the desired trajectory. In that system, the position coordinates of the mole in the magnetic flux plane of the antennas as well as its pitch, yaw, and roll angles all are continuously calculated from voltages detected in a trio of mutually orthogonal magnetometers fixed in the mole body. From these voltages appropriate steering instructions are given the mole to cause it to assume the desired heading.

This earlier system recognized the advantages of a dipole-quadrupole antenna. For example, calculation of the mole depth is a simple function of the antenna half spacing. Mole distance from the center wire, measured in multiples of the antenna half spacing, is equal to the ratio of dipole to quadrupole field strength, as measured by magnetometers in the mole at the mole location. Also, the polar angle at the origin is exactly equal to the included angle between the field vectors, as measured by the mole magnetometers.

While thus constituting a fully workable location detection scheme, the earlier system nevertheless has several drawbacks. For one, the computations of position and heading data requires extensive logic circuitry. More importantly, the system does not provide for the mole to seek out a prescribed trajectory. Moreover, the trajectory itself is not superimposable onto the system.

Accordingly, the principal object of this invention is to simplify the control of a subterranean missile in its movement from one point to another along a prescribed path.

Another object of the invention is to automatically guide a mole to a specified terminal point within a reference frame defined by a pair of magnetic field-generating antennas.

A further object of the invention is to achieve an automatic mole guidance system in which the terminal point which the mole seeks can be respecified at will.

SUMMARY OF THE INVENTION

The present invention, broadly, is grounded in the recognition of the advantages of a rotating magnetic field vector at the mole location. Mole heading errors can be directly detected by phase comparison of the induced voltages in an axial magnetometer in the mole body with that in a magnetometer mounted in an articulatable steering surface.

The heading error is the angle between the mole longitudinal axis and a line parallel to the magnetic field propagating antenna. The heading error is zero when the mole axis is parallel to the antenna wire. In this position, no voltage is induced in the axial magnetometer; but with heading error from any mole orientation whatsoever, a small but detectable voltage is induced in the axial magnetometer. The trajectory which would reduce the heading error to zero lies in the plane defined by the mole axis and a line through the mole parallel to the antenna wire. Thus, a steering surface articulated in that plane will cause the heading error to reduce to zero. The steering surface is placed in that plane by manipulating the surface until, pursuant to the invention, the aforementioned induced voltages are in phase with each other.

The rotating magnetic field can be produced by any convenient antenna configuration energized to produce a rotating vector. An antenna configuration which is preferred because of the simple geometric relationships which it provides, is the dipole-quadrupole scheme of the aforementioned U.S. Pat. No. 3,529,682. For that antenna configuration, as well as for certain others, a preferred antenna energization is with signal currents of the same frequency but differing by a phase factor.

For heading error correction pursuant to the invention, the magnetic field vector must merely rotate. It need not describe a circular path and, in fact, can be widely elliptical with no performance penalty.

However, pursuant to a further and major facet of the invention, a field maintained in circular polarization at the mole location permits control of the mole's position in three-dimensional space through the expedient of heading control. A mole trajectory originating from its present position and extending to a desired terminal point is specified according to this aspect of the invention by summing an appropriate voltage phasor with the output signal of the mole axial magnetometer. The specified trajectory can be one parallel to the antenna, or diverging or converging with respect thereto. The superimposed voltage phasor plus the induced voltage in the axial magnetometer produces a voltage phasor output identical to the phasor that would have been induced had the antenna been actually moved to a position directly above and parallel to the chosen trajectory. Steering then proceeds in exactly the same manner as above. The steering surface is manipulated until voltages in its magnetometer and in the mole axial magnetometer are in phase; and the surface is articulated so as to keep them in phase. The heading error to be reduced to zero now, however, is with respect to the line between the mole's present position and the desired terminal point.

One feature of the invention, therefore, is the use of a rotating magnetic vector which provides a phase comparison way to find the correct position of a mole steering surface to counteract any heading error.

A further feature of the invention involves defining new mole trajectories which the mole seeks out by heading control using the same phase comparison methods, thereby providing the capability of steering toward any desired terminal point.

The invention, its further objects, features and advantages will be fully apprehended from a reading of the description to follow of an illustrative embodiment.

DETAILED DESCRIPTION OF AN ILLUSTRATIVE EMBODIMENT

Figures 1, 1A:
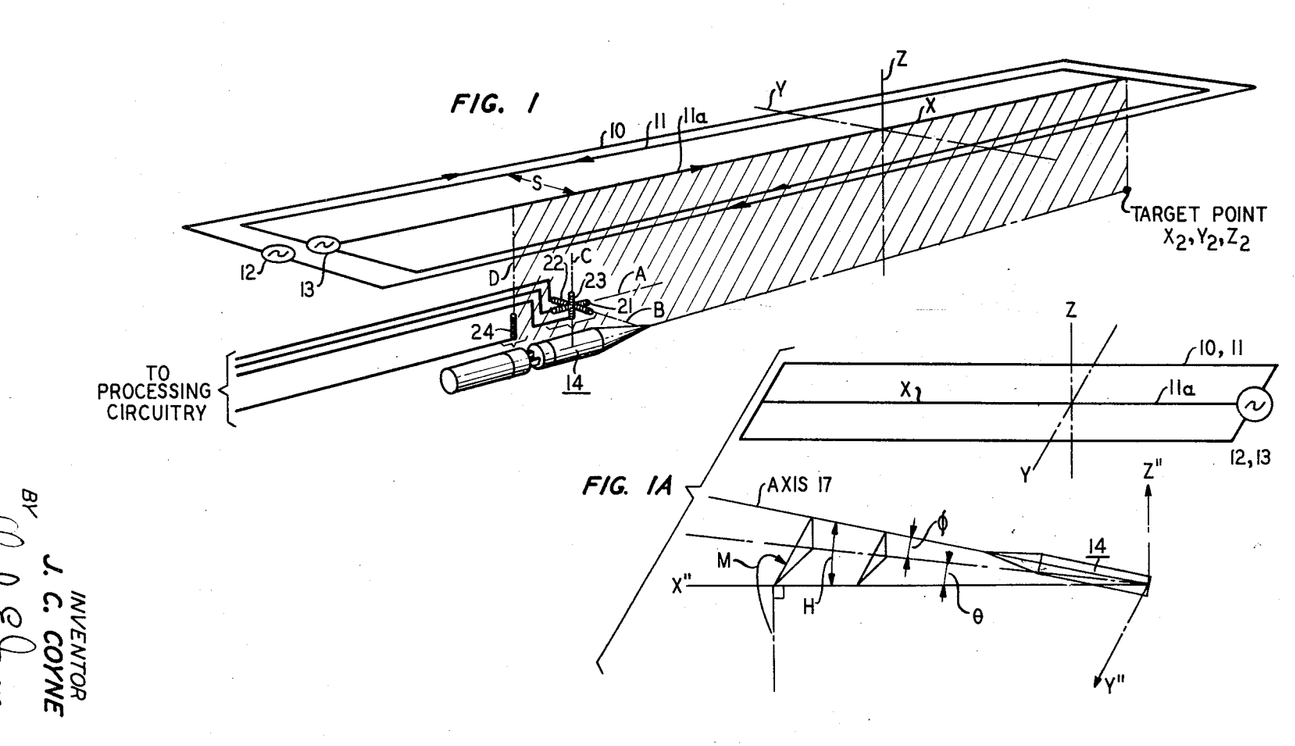
FIG. 1 is a schematic perspective diagram of the mole and antenna system.
FIG. 1A is a perspective diagram depicting certain geometric relations.

The mole working environment is shown schematically in FIG. 1. Current-carrying conductors in the form of a dipole antenna 10 and a quadrupole antenna 11 are laid on the ground over the desired route. Their construction and mounting details are described in the aforementioned U.S. Pat. No. 3,529,682. AC voltages are applied to antennas 10, 11 by power amplifiers 12, 13, respectively. The voltages are maintained at the same frequency, for example, 5 kHz, but, importantly, differ in phase in a manner to be described.

Figure 2:
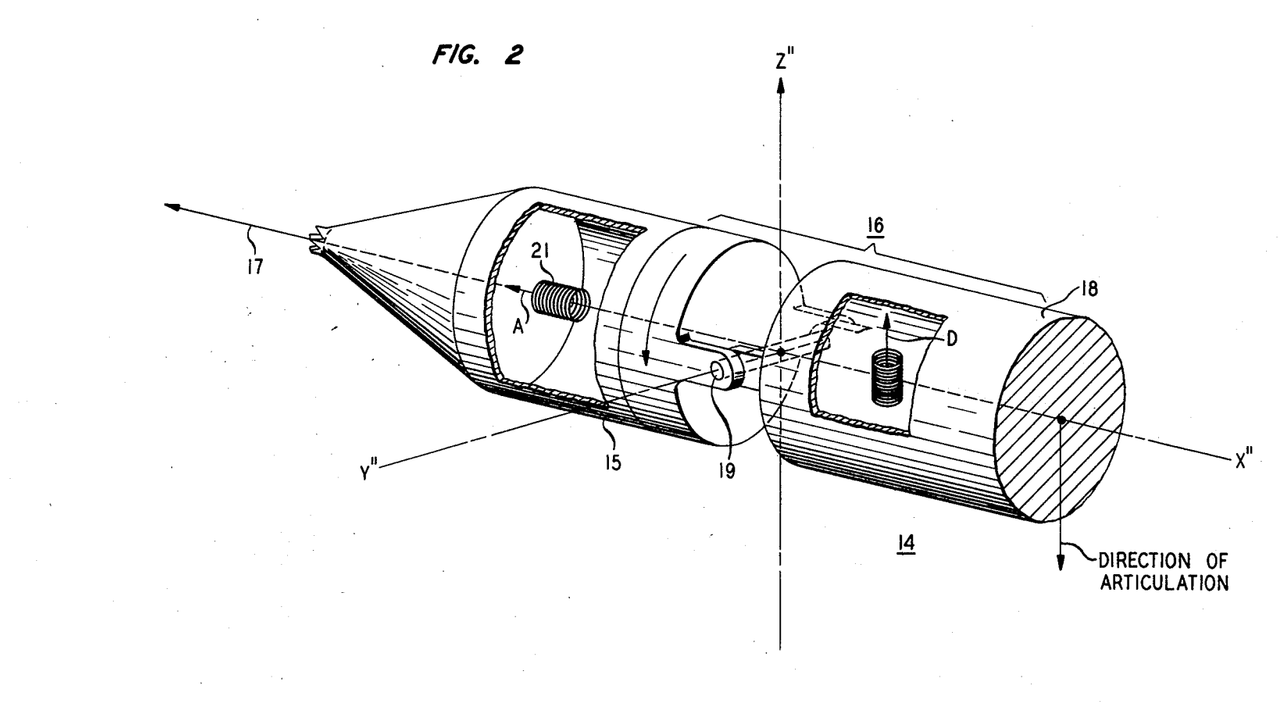
FIG. 2 is a schematic perspective diagram of the mole articulating tail.
Figure 6:
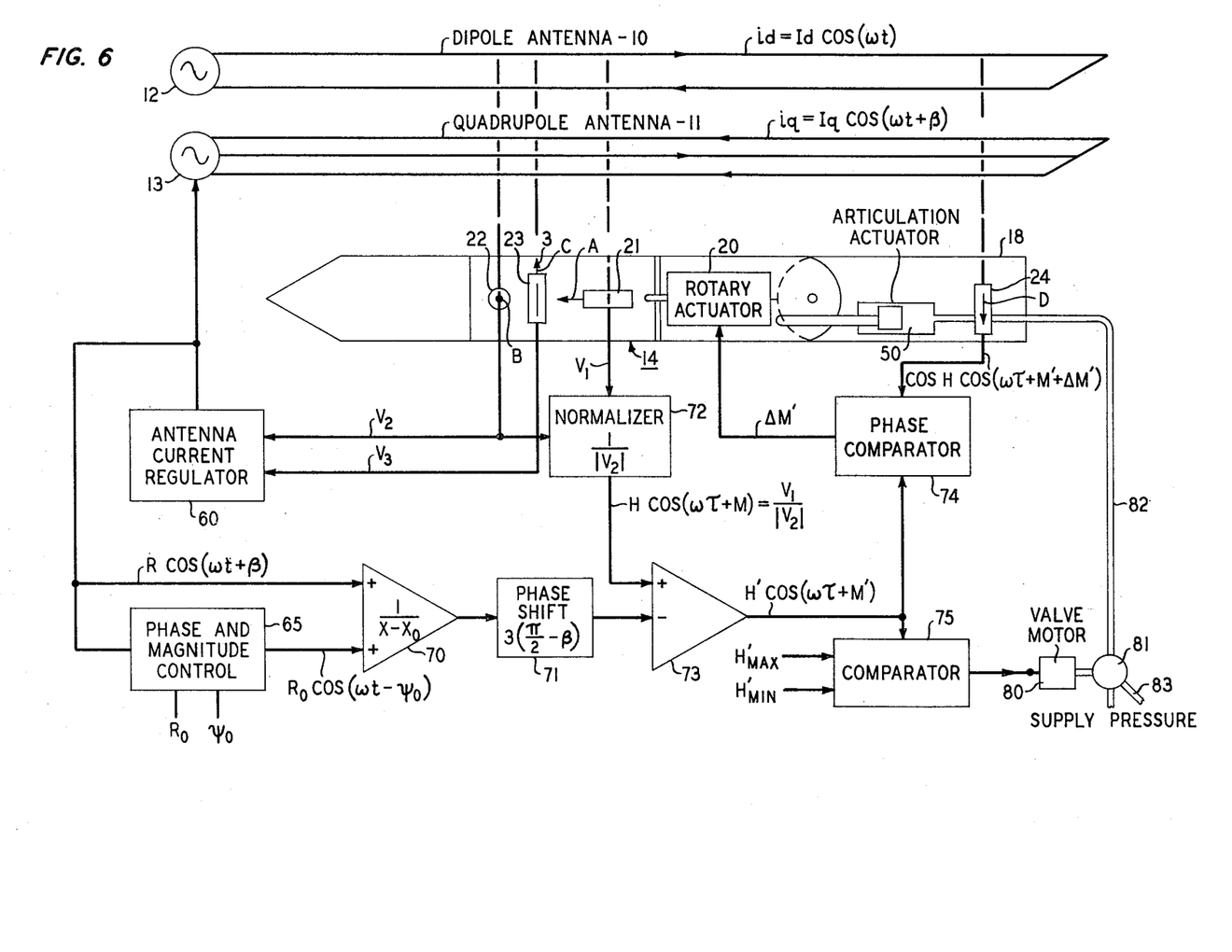
FIG. 6 is a block diagram of an overall mole guidance system pursuant to the invention.

FIG. 2 shows a mole 14 equipped with suitable components for use in the present guidance system. Mole 14 consists of a body 15 and a tail assembly 16. Assembly 16 is mounted for rotational movement a full 360° about the centerline axis 17 of body 15. The tail itself, designated 18, is pivotable about a fixed clevis pin 19 which is perpendicular to axis 17. Control of rotation of assembly 16 and articulation of tail 18 are affected by conventional servomechanisms consisting of rotary actuator 20 and articulation actuator 50 which are shown in FIG. 6 schematically.

FIGS. 1 and 2 show three magnetometers such as induction coils 21, 22, 23, fixedly mounted in mole 14. Their sensitive axes A, B, C are mutually orthogonal. As installed, axis A of coil 21 is coincident with the mole centerline axis 17. A fourth magnetometer such as coil 24 is mounted in tail 18 with its sensitive axis D normal to the extended center line axis 17 and also normal to clevis pin 19. Electrical connections run from each magnetometer to the processing circuitry which will be fully explained with reference to FIG. 6.

CIRCULAR POLARIZATION

Figure 4:
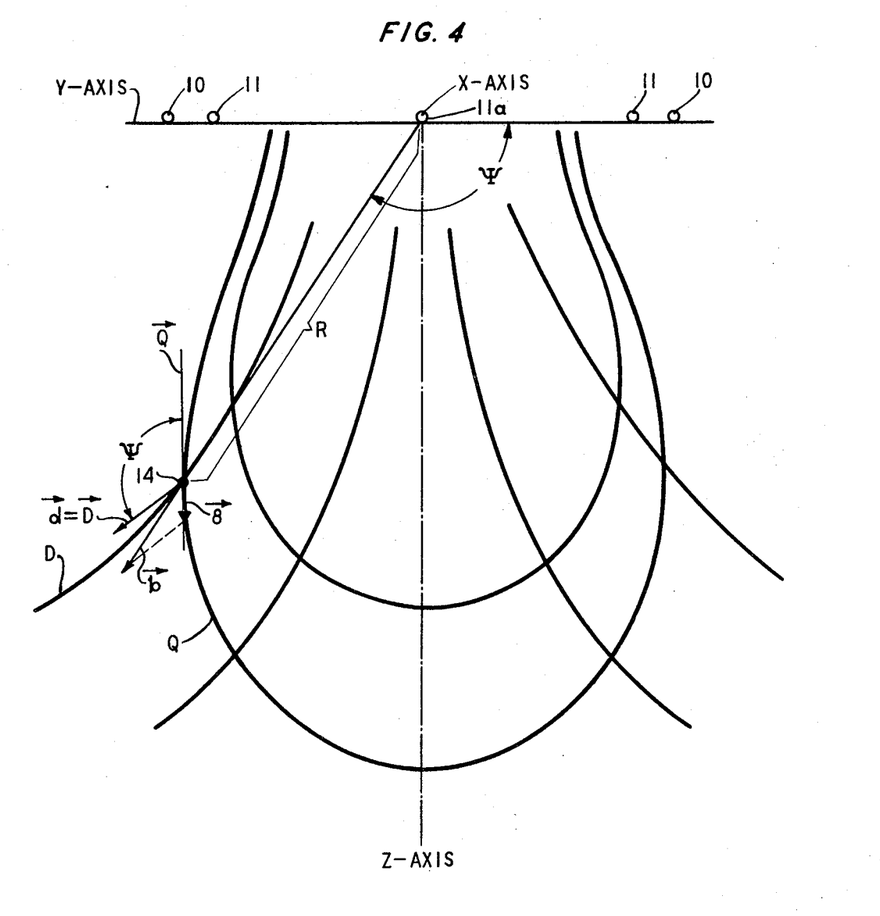
FIG. 4 is a diagram, taken in the flux plane of the antenna system and showing certain critical geometric relationships between the mole and a magnetic field vector.

As two distinct magnetic fields exist in the soil bulk, the net field illustrated in FIG. 4 at a specified point and time is given by the vectorial addition of the separate fields, the latter denoted D, Q. Consider their vectorial addition for an arbitrarily chosen position of mole 14 as seen in the flux plane. The field vectors D, Q have peak values of $\vec{D}, \vec{Q}$, respectively. As the fields are out of phase, the peaks occur at different times. At the given time, their instantaneous values are $\vec{d}, \vec{q}$. In FIG. 4, vector $\vec{d}$ was arbitrarily taken at its maximum value $\vec{D}$. The vector resultant of the instantaneous vectors $\vec{d}, \vec{q}$, is $\vec{b}$.

It is seen that $\vec{b}$ rotates in space with passing time, and in general describes an ellipse. Resultant vector $\vec{b}$ passes through the sensitive axes, A, B, C, D of coils 21–24; and voltages are induced in each coil. When the component of $\vec{b}$ along a coil is maximum, the induced voltage in that coil is a maximum. These sinusoidal voltages are denoted $V_1, V_2, V_3, V_4$ respectively for the coils 21–24; voltages $V_1$ and $V_4$ are schematically depicted in FIGS. 3A and 3B.

It may be desired, as for certain purposes of the present invention, to provide a circularly polarized magnetic field, i.e., to cause $\vec{b}$ to rotate with constant angular velocity and constant magnitude. The following considerations then apply. FIG. 4 illustrates that $\vec{D}$ and $\vec{Q}$ differ in direction by the geometric angle $\Psi$. Further, $\vec{d}$ and $\vec{q}$ differ in phase by the angle $\beta$ which is the phase difference between the applied sinusoidal currents $i_d$ and $i_q$ to antennas 10, 11. Omitting proof, the conditions for circular polarization are:

$$\vec{D} = \vec{Q};$$

$$\beta = \pi - \Psi$$

Such conditions are maintained, for example, by mOnitoring the voltages induced in coils 22, 23 whose axes B, C lie in or near the place of flux. When the field is circularly polarized, the voltages $V_2, V_3$ induced by $\vec{b}$ in coils 22, 23 have equal magnitude and 90 degrees phase difference. This is achieved, for example, by fixing the dipole antenna current $i_d$ and by providing means for controlling the phase and magnitude of the quadrupole current $i_q$ so that the field at the mole location is circularly polarized.

If now the mole undergoes a position change, the field becomes slightly elliptical, and the output voltages $V_2, V_3$ of magnetometers 22, 23 will change slightly in both amplitude and phase. A small correction of both magnitude $\Delta I_q$ and phase $\Delta \beta$ of $i_q$ is required to reestablish the circular field and is achieved in the antenna current regulator 60 shown in FIG. 6.

It should be understood that the invention broadly involves the use of a rotating magnetic field vector. Accordingly, while the antenna signal frequencies have in the illustrative embodiment been specified to be the same while differing by a phase factor, other schemes exist for realizinG a rotating vector. Also, while the dipole-quadrupole antenna described is applicant's preferred mode, other antenna structures can be envisioned for realizing the rotating vector. The advantages of the dipole-quadrupole configuration are that with the driving current described earlier and circular polarization, a simple determination of mole position is afforded. That is, the ratio of quadrupole antenna peak current to dipole antenna peak current equals the distance from the antenna center wire 11a (measured in multiples oF the antenna half spacing). Also, the supplement of the phase difference between dipole and quadrupole antenna currents equals the polar angle. This point and others will now be expanded.

AUTOMATIC HEADING CONTROL

The rotating magnetic vector $\vec{b}$, pursuant to a major facet of the invention, enables finding the correct position of a steering control surface such as tail 18 to counteract any heading error.

The coordinate system notations used below and alluded to elsewhere also bear summarization at this point. The XYZ system is with reference to the stationary antenna as seen in FIGS. 1 and 1A, for example; the X-axis is coincident with the center wire 11a, and the XY plane is defined by the antenna wires 10, 11, 11a. Position in the soil bulk is measured conveniently with reference to the XYZ system. The X'Y'Z' system is a coordinate system located with reference to the XYZ system, and comes into play when a new trajectory is to be specified in a manner to be described. The X"Y"Z" system moves with the mole, its axes being always parallel to the respective axes of the XYZ system.

Heading error is any orientation of mole 14 which brings the centerline axis 17, and the coincident magnetometer axis A, out of parallelism with the X" axis, as illustrated in FIG. 1A. In the earlier J. C. Coyne et al. U.S. Pat. No. 3,529,682, heading error included a pitch component $\Phi$ and a yaw component $\theta$. Ascertaining these angles required substantial added equipment complexity. As will shortly be seen however, the present invention renders it completely unnecessary, in correcting for heading error, to calculate the values of either; nor is it necessary to compute a roll angle.

Figure 3:
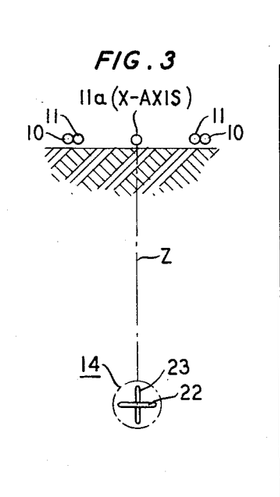
FIGS. 3, 3A, 3B, and 3C are schematic diagrams, taken with the plane of flux lyinG in the paper, and showing the mole and tail in various working positions with resulting voltages induced in certain coils.
Figures 3A, 3B:
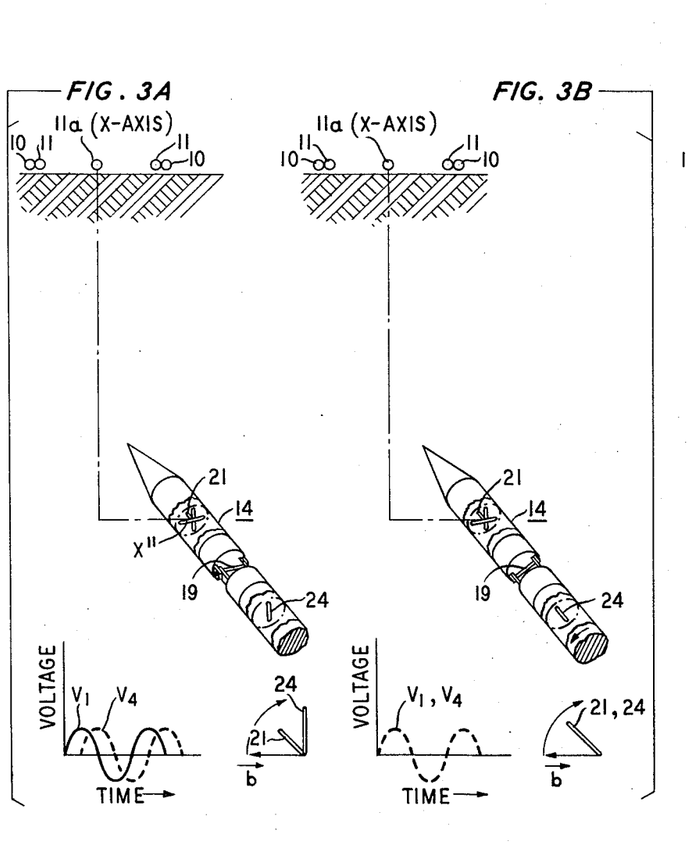

In FIGS. 1 and 3 the mole 14 is depicted as being on trajectory, moving toward a target point $X_2Y_2Z_2$ with zero heading angle. Thus, mole 14 is directly under the antenna center wire 11a. Rarely in practice, however, is the mole ideally positioned.

FIG. 1A illustrates the more usual situation. The mole is shown as deviating from the desired heading, namely the X" axis. This heading deviation is measured by the various angles shown, and now defined.

$\Phi$, called the pitch angle, is the angle between the mole axis 17 and its projection on the X"Y" plane.

$\theta$, called the yaw angle, is the angle between the projection of the mole axis 17 on the X"Y" plane and the X" axis.

H, called the heading angle, is the angle between the mole's axis 17 and the X" axis.

M is the angle between the projection of the mole's axis 17 on the Y"Z" plane and the negative Z" axis.

$\theta$ and $\phi$ are related to H and M by the following equations:

$$H^2 = \theta^2 + \Phi^2$$

$$\tan M = \theta/-\Phi$$

Accordingly, FIG. 3A depicts the mole as deviating in position and also from the desired heading by an arbitrary heading error angle H which, it will be understood, consists of a pitch and a yaw component. The object is to find a rotational position for tail 18 such that, with articulation, the mole follows a trajectory that not only reduces H, but reduces H to zero.

Consider that when the mole tail 18 is articulated, the mole trajectory lies in a plane defined by the mole centerline axis and the axis of tail 18. The heading error angle H can go to zero only if said plane also includes the X" axis. Accordingly, the problem reduces to articulating tail 18 in the plane defined by the X" axis and the mole centerline axis 17.

Figure 3C:
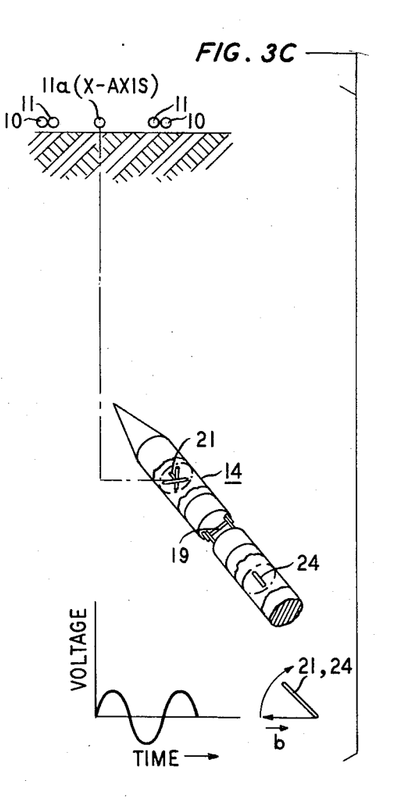

It can be seen by reference to FIGS. 3A-3C that the correct rotational position of tail 18 occurs when the voltage induced by $\vec{b}$ in coils 21 and 24 are in phase. With any heading error, axis A of coil 21 has a projectable component in the plane of flux, as seen in FIG. 3A. In such case, as seen in the bottom diagram of FIG. 3A vector $\vec{b}$ induces a voltage $V_1$ in coil 21 which peaks when the component of vector $\vec{b}$ on axis A is maximum. If the field were exactly circular this would occur when vector $\vec{b}$ and axis A were coincident. Tail coil 24 when viewed in the flux plane has a voltage $V_4$ induced by vector $\vec{b}$.

Owing to the initial random rotation of tail 18 with respect to the mole body, however, the induced voltages in coils 21 and 24 differ by a phase factor. This phase difference is monitored by suitable circuitry such as depicted in FIG. 6. Rotary actuator 20 then is servoed until the phase difference is zero as shown in FIG. 3B. Coil axes A and D now lie in a plane that includes the X"-axis. Articulation of tail 18 around pin 19 at this time as depicted in FIG. 3C, will place the mole on a trajectory that at some time is assured of bringing the mole parallel to the X-axis, thus reducing the heading error angle H to zero.

When the tail 18 articulates, the magnitude of voltages induced in coil 24 will decrease, but the phase will remain unchanged. Further, as the mole 14 proceeds along its curved trajectory in seeking a zero heading angle error, the phase of voltage $V_4$ will continue to remain unchanged provided no disturbances roll the missile or divert it out of the desired trajectory plane.

If the mole is diverted, however, then the voltage phasors $V_1$ and $V_4$ will be once again out of phase, and the inventive heading correction procedure will continuously correct. If the articulation angle is too large that the rotary unit 20 cannot turn the tail against soil forces, the tail is straightened and then rotated until $V_1$ and $V_4$ are in phase; and then the tail is rearticulated. If the articulation angle is not great, a new rotary position of tail assembly 16 can be sought without straightening the tail.

The articulation angle itself is chosen to the desired turning curvature and does not affect the phase matching of voltages $V_1$ and $V_4$. The change in magnitude of voltage $V_4$ as tail 18 articulates does provide a means of measuring the articulation angle, however.

The voltages $V_1$ and $V_4$ are depicted in FIGS. 3A-3C as being equal in magnitude merely for ease of illustration. They need not be; and in practice rarely are.

It should be understood that the critical inventive point thus far is the correction of heading angle errors by phase comparison techniques, in which the phase of the voltage induced in the axial magnetometer 21 by a rotating magnetic field vector is compared to the phase of the voltage induced in the magnetometer 24 which is fixed in the steering member in a predetermined orientation. This orientation is with respect to the sensitive axis D and the corresponding steering attitude which the steering member exhibits—or as in the instant embodiment, would exhibit, if articulated. Accordingly it is clear that the phase comparison does not require that there be zero phase difference between the induced voltages. It requires only that the phase difference be known which corresponds to the orientation of the steering member magnetometer axis D (and thus also the steering member itself) that will reduce the heading angle error to zero. To this end, the choice of a zero phase difference is convenient.

HEADING CONTROL PLUS POSITIONAL CONTROL

In the system so far described, control of the mole's heading angle enables the mole's centerline axis 17 to be kept parallel to the antenna center wire 11a. In many field situations, heading control in the above terms with respect to the stationary center wire would suffice as a complete guidance system if, among other considerations, the mole is originally planted parallel to the antenna center wire and if further the trajectory is not long. There are, however, an infinite number of lines parallel to the center wire, any one of which could be assumed by the mole centerline axis to satisfy the requirement of zero heading angle error. Accordingly, the likely positional error at the terminal point increases with increasing trajectory length until it becomes intolerably large.

Pursuant therefore to a further major aspect of the invention, positional control is incorporated into the guidance scheme by causing the system to guide—again, by heading control—along any new chosen straightline path from the mole, and not just a path parallel to the antenna center wire. The new path advantageously can be one which links the mole and any desired target point.

Such target point normally is directly beneath the center wire and represents the terminal point of mole travel. The target point can, however, be both horizontally and vertically removed from the nominal terminal point directly below the center wire end. Further, the target point can be respecified any number of times.

Figure 5A:
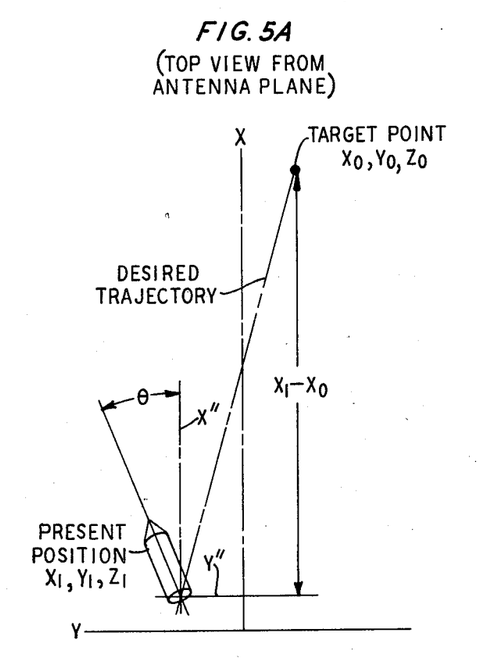
FIGS. 5A, 5B, 5C, and 5D are diagrams illustrating the critical geometric relationships of mole heading in terms of a new desired trajectory.

Implementation of position control is depicted in FIG. 6; and involves generating a sinusoidal voltage, denoted $R_o \cos(\omega t - \Psi_o)$. The latter voltage has a magnitude and phase equal to the polar coordinates $R_o, \Psi_o$ (FIG. 5B) of the target point $X_o Y_o Z_o$ (FIG. 5A). The quantities $R_o$ and $\Psi_o$ are set, either manually or otherwise, into a phase and magnitude control 65.

Control 65 derives another input directly from the quadrupole antenna 11. Antenna current regulator 60, as already described, monitors the voltages $V_2$ and $V_3$ induced in coils 22, 23 and adjusts the antenna current $i_q$ to values that maintain circular polarization.

The sinusoid $R_o \cos(\omega t - \Psi_o)$ is then added in summing amplifier 70 to the sinusoidal quadrupole antenna voltage $R \cos(\omega t + \beta)$. The gain of amplifier 70 is proportional to $1/X + X_o$, the forward distance of the target point.

The summing amplifier 70 output is phase-shifted in circuit 71 by the factor $3(\pi/2 - \beta)$ to place the zero phase reference on the $-Z_1$ axis; and then added in summing amplifier 73 to the voltage induced in magnetometer 21. The latter has been normalized in circuit 72 by the field strength as measured by the rms voltage $V_2$. Normalization can as well be achieved with the rms voltage $V_3$ in the same fashion. The output of the normalizing operation is a sinusoidal voltage whose amplitude is the heading angle H measured in radians, and whose phase in the angle M as seen in FIGS. 1A and 5B.

Figure 5B:
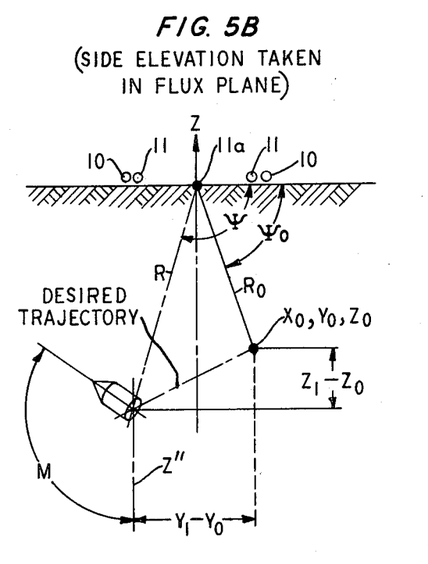
Figure 5C:
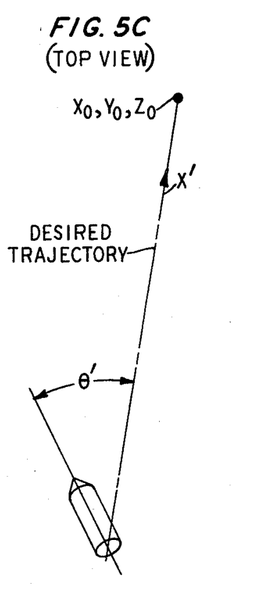
Figure 5D:
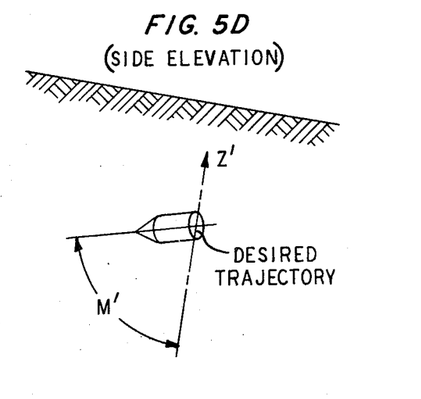

The output of summing amplifier 73 yields a new voltage phasor, denoted $H' \cos(\omega t + M')$ whose amplitude $H'$ is the heading angle of the mole with respect to the new desired trajectory $X'$ seen in FIGS. 5A–5C; and whose phase is the angle $M'$ shown in FIG. 5D.

The output of summing amplifier 73 is fed to two comparators 74 and 75. In comparator 74 the phase of the voltage in coil 24 is compared with the phase of output of summing amplifier 73. The difference error signal $\Delta M'$ is used to drive the rotary actuator 20 until the error signal goes to zero. This operation places the tail 18 in a position such that when articulated the heading angle with respect to the $X'$ axis will go to zero.

In the second comparator 75 the amplitude of the output of summing amplifier 73 is compared with two reference voltages, H' max. and H' min. These are, for example, set in manually and represent the dead zone of the on-off control of the tail articulation actuator 50. When H' exceeds H' max. the valve motor 80 is turned on, opening valve 81 to hydraulic supply pressure which drives actuator 50 through suitable hydraulic connections 82. With tail 18 articulated, the mole assumes a trajectory that begins to reduce the heading angle H' toward zero. When H' drops below H' min., comparator 75 signals valve motor 80 to remove supply pressure; and the fluid pressure is relieved as through return line 83. The mole tail straightens out in about a tail length of travel.

The capability of specifying and respecifying the mole target point has numerous highly useful ramifications. It is, for example, possible to correct for the natural tendency of the mole to surface due to the greater strength of soil below the mole bottom, simply by moving the target point closer in toward the mole. Obstructions such as rocks, drain pipes and the like, whose locations are known, are readily avoided by specifying a series of safe trajectories. It further is possible to steer straight paths under bushes, for example, where laying the antenna in a straight path is precluded. Also, the antenna does not require any relocation in the process of specifying the trajectory. Additionally, the mole can be caused to fare into a desired trajectory in a sweeping arc, simply by leaving the gain of amplifier 70 constant. Aiming at a fixed point in contrast requires changing of the amplifier gain.

Numerous additional advantages, variations and embodiments of the invention will be readily envisioned by persons skilled in the art. The spirit of the invention is limited only by the scope of the claims to follow.

What is claimed is:

1. Apparatus for controlling heading of a steerable mole comprising,
    antenna means for generating a circularly polarized magnetic vector at the mole location in the soil;
    means for specifying a target point as a first sinusoidal voltage by polar coordinates in the plane of said field measured with respect to the center line of said antenna means, and a look-ahead distance measured between the mole'-present position and said target point as projected on a line parallel to said antenna means;
    means for ascertaining the mole's present position in terms of a second sinusoidal voltage whose magnitude and phase correspond to polar coordinates measured in the plane of said circular field;
    means for combining said first and second voltages into a resultant voltage representing the positional error of said mole as measured in said circular field plane;

means for multiplying said resultant voltage by a numerical scale factor determinative of how fast the mole will return to course, said scale factor being equal to said look-ahead distance;

means for combining said multiplied resultant voltage with the voltage induced by said field in an axially mounted magnetometer, thereby producing a third voltage whose magnitude and phase correspond to the heading of said mole with respect to a line between the mole and said target point;

means for defining a phase difference between said third voltage and the phase of a voltage induced in a second magnetometer axially perpendicular to said mole axis and disposed in the plane of the steering effort;

a controlled steering of said mole at this stage causing said phase difference to approach a specified value, and also causing the magnitude of said third voltage to approach zero.

* * * * *